(12) United States Patent
Chang

(10) Patent No.: US 7,240,927 B2
(45) Date of Patent: Jul. 10, 2007

(54) CONNECTION ASSEMBLY USED FOR CONNECTION BETWEEN A FUEL NOZZLE AND A FILLING HOSE

(76) Inventor: King Chang, 9F-2, No. 197, Sec. 1, Heping E. Rd., Taipei (TW)

( * ) Notice: Subject to any disclaimer, the term of this patent is extended or adjusted under 35 U.S.C. 154(b) by 212 days.

(21) Appl. No.: 11/144,820

(22) Filed: Jun. 6, 2005

(65) Prior Publication Data

US 2007/0001449 A1    Jan. 4, 2007

(51) Int. Cl.
F16L 39/00 (2006.01)
F16L 21/06 (2006.01)
(52) U.S. Cl. ............... 285/321; 285/322; 285/243; 285/305; 285/921
(58) Field of Classification Search .......... 285/1, 285/114–116, 243, 260, 276, 305, 319, 321–324, 285/388, 913, 921
See application file for complete search history.

(56) References Cited

U.S. PATENT DOCUMENTS 5,178,424 A * 1/1993 Klinger ............... 285/319
5,346,260 A * 9/1994 Meyer-Berg et al. .......... 285/1
RE36,630 E * 3/2000 Davey .................... 285/39
6,241,292 B1 * 6/2001 Yang ................... 285/340
6,851,728 B2 * 2/2005 Minami ................ 285/339
2002/0070550 A1 * 6/2002 Lin et al. .............. 285/305

* cited by examiner

*Primary Examiner*—Aaron Dunwoody
*Assistant Examiner*—Fannie C. Kee
(74) *Attorney, Agent, or Firm*—Birch, Stewart, Kolasch & Birch, LLP

(57) ABSTRACT

A connection assembly has a male connector, a first engaging ring securely mounted on the male connector, a female connector and a second engaging ring securely received in the female connector. The first engaging ring has first claws formed to abut a periphery defining the second annular groove formed on the female connector and the second engaging ring has second claws formed to abut a periphery defining the first annular groove formed on the male connector. Engagement between the male connector and the female connector is accomplished after the abutment between the first claws and the second annular groove and between the second claws and the first annular groove is finished.

8 Claims, 4 Drawing Sheets

CONNECTION ASSEMBLY USED FOR CONNECTION BETWEEN A FUEL NOZZLE AND A FILLING HOSE

BACKGROUND OF THE INVENTION

1. Field of the Invention

The present invention relates to a connection assembly, and more particularly to a connection assembly used for connection between a fuel nozzle and a filling hose to facilitate separation between the fuel nozzle and the filling hose when the fuel nozzle encounters a pulling force so as to avoid hazard caused by the breakage of the filling hose.

2. Description of Related Art

U.S. Pat. No. 5,346,260 ('260) discloses a conventional coupling member for connecting a fuel nozzle to a filling hose. The coupling member is composed of a male coupling member and a female coupling member. The coupling member is able to facilitate the separation between the male coupling member and the female coupling member to prevent the entrainment of the nozzle by the vehicle from rupturing the hose or damaging the fuel pump having a detent which is wedged out of engagement by a torque applied to the male member within the female member against the force of a restoring spring because of play between the male and female coupling members.

The structure disclosed in the '260 patent does have the function and ability to facilitate the separation between the fuel nozzle and the filing hose, however because the engagement between the male coupling member and the female coupling member depends solely on the detent ring and the restoring spring, it is quite easy for the filling hose and the fuel nozzle to separate when the vehicle is applying a force to the fuel nozzle, which causes a lot of unnecessary trouble in fixing the separated fuel nozzle and the filling hose.

To overcome the shortcomings, the present invention tends to provide an improved connection assembly to mitigate the aforementioned problems.

SUMMARY OF THE INVENTION

The primary objective of the present invention is to provide a connection assembly having a male connector and a female connector. The male connector further has a first engaging ring mounted around the male connector and the female connector has a second engaging ring received inside the female connector such that when the male connector is partially received in the female connector, the first engaging ring is able to securely engage with an inner periphery of the female connector and the second engaging ring is able to engage with an outer periphery of the male connector so as to accomplish the connection between the male connector and the female connector. Whereby when the fuel nozzle experiences a rupturing force, due to the material for both the first engaging ring and the second engaging ring being resilient plastic, separation between the fuel nozzle and the filing hose is certain only when the rupturing force reaches a specified level.

In one aspect of the present invention, the male connector has a first annular groove defined in the outer periphery of the male connector to correspond to the second engaging ring and the female connector has a second annular groove defined in the inner periphery of the female connector.

In yet another aspect of the present invention, the first engaging ring has multiple first claws extending outward to correspond to a periphery defining the second annular groove and the second engaging ring has multiple second claws extending inward to correspond to a periphery defining the first annular groove so as to allow the first claws to engage with the periphery defining the second annular groove and the second claws to engage with the periphery defining the first annular groove.

A further aspect of the present invention is that an engagement strength of the first claws to the periphery defining the second annular groove is dependent from a width of the first claws, and an engagement strength of the second claws to the periphery defining the first annular groove is dependent from a width of the second claws.

Other objects, advantages and novel features of the invention will become more apparent from the following detailed description when taken in conjunction with the accompanying drawings.

DETAILED DESCRIPTION OF THE PREFERRED EMBODIMENT

Figure 1:
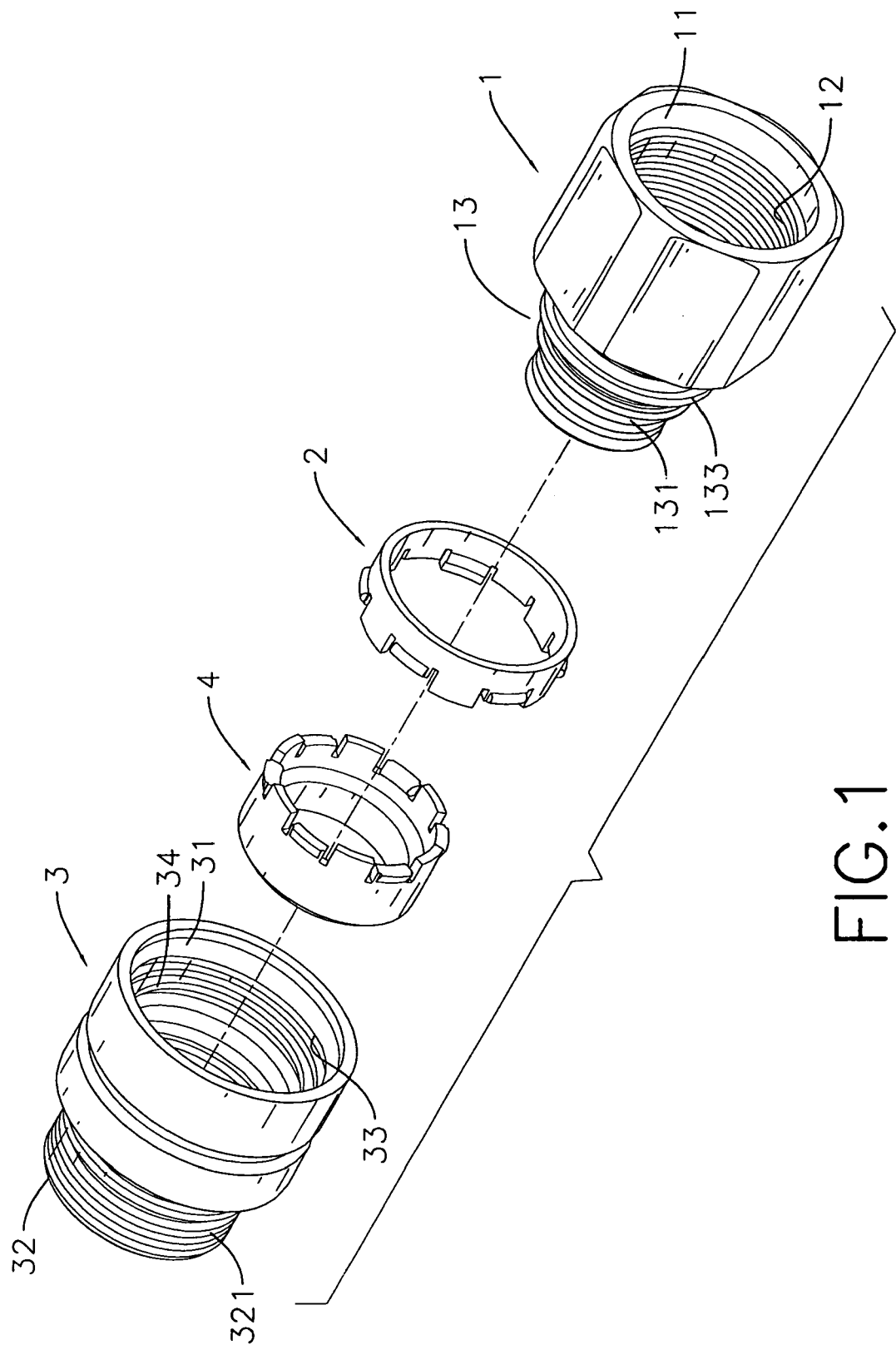
FIG. 1 is an exploded perspective view showing the components of the connection assembly of the present invention.

With reference to FIG. 1, it is noted that the connector assembly in accordance with the present invention includes a male connector (1) and a female connector (3). Furthermore, a first engaging ring (2) is to be mounted around the male connector (1) and a second engaging ring (4) is to be mounted inside the female connector (3).

The male connector (1) has a bore (11) defined through the male connector (1), an inner threading (12) formed on an inner periphery defining the bore (11) for connection with a filling hose (not shown) and a hollow extension (13) extending out of the male connector (1) and having two open ends, an outer annular sidewall and a first annular groove (131) defined in an outer periphery of the extension (13). The extension (13) of the male connector (1) may further have an outer annular lip (133) radially extending outward from the outer annular sidewall of the extension (13).

The first engaging ring (2) has a diameter slightly larger than a diameter of the extension (13) so that the first engaging ring (2) is able to be securely mounted around the extension (13).

The female connector (3) has a passage (31) defined through the female connector (3), a hollow skirt (32) extending out of the female connector (3) and having two open ends, an outer threading (321) formed on an outer periphery of the skirt (32) for connection with a fuel nozzle (not shown) and a second annular groove (33) defined in an inner periphery of the female connector (3) defining the passage (31). The female connector (3) may further have an inner annular lip (34). The inner annular lip (34) extends inward from the inner periphery of the female connector (3).

Figure 2A:
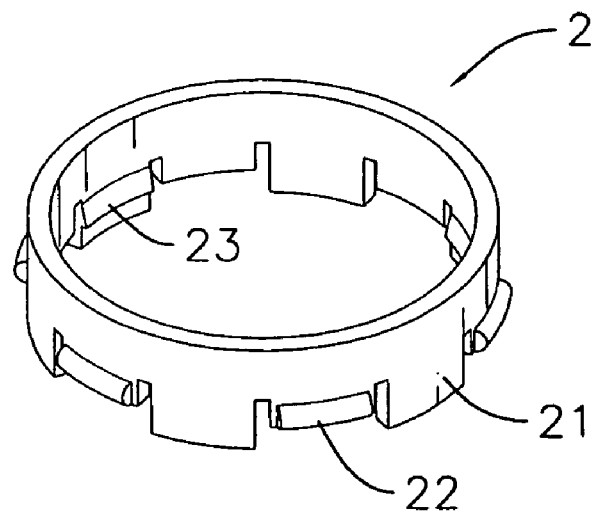
FIG. 2A is a perspective view of the first engaging ring.
Figure 2B:
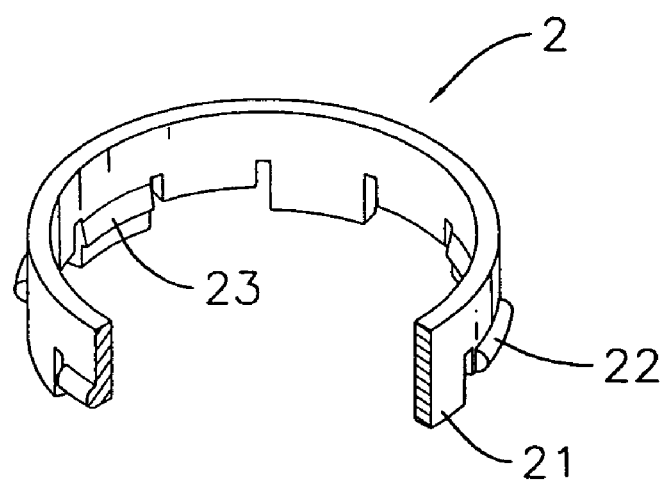
FIG. 2B is a partially cross sectional perspective view of the first engaging ring.

With reference to FIGS. 2A and 2B, it is noted that the first engaging ring (2) has an inner annular sidewall, is provided with multiple legs (21) extending from a peripheral edge of the first engaging ring (2) and first claws (22) intermittently or alternately extending outward from a distal end of each of the legs (21). The first engaging ring (2) may further have multiple inner hooks (23). The inner hooks (23) extend inward from the inner annular sidewall and hook outer annular lip (133) on the extension (13) of the male connector (1) to securely mount the first engaging ring (2) around the male connector (1).

Figure 3A:
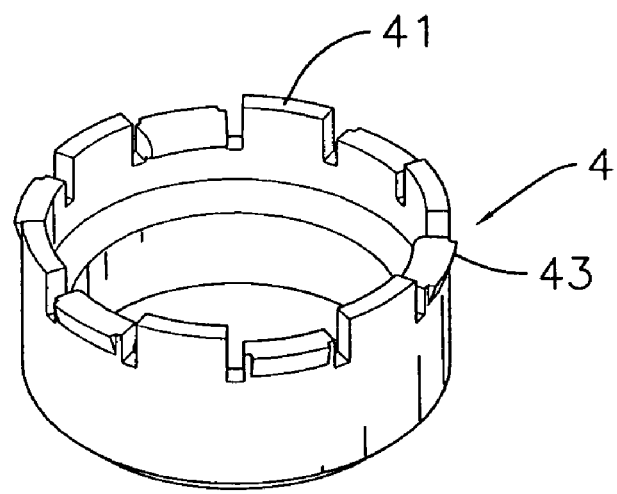
FIG. 3A is a perspective view of the second engaging ring.
Figure 3B:
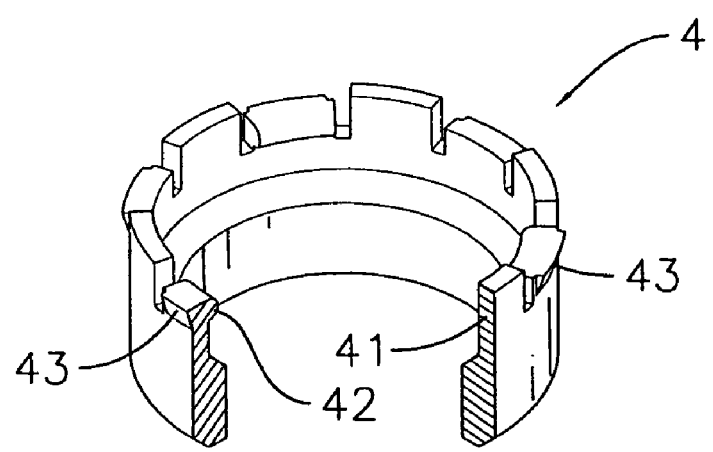
FIG. 3B is a partially cross sectional perspective view of the second engaging ring.

With reference to FIGS. 3A and 3B, it is noted that the second engaging ring (4) has an outer annular sidewall, is provided with multiple fingers (41) extending upward from a peripheral edge of the second engaging ring (4) and second claws (42) intermittently or alternately extending inward from a distal end of each of the fingers (41). The second engaging ring (4) may further have multiple outer hooks (43). The outer hooks (43) extend outward from the outer annular sidewall of the second engaging ring (4) and hook annular inner lip (34) on the inner periphery of the female connector (3) to securely connect the female connector (3) to the male connector (1).

Figure 4:
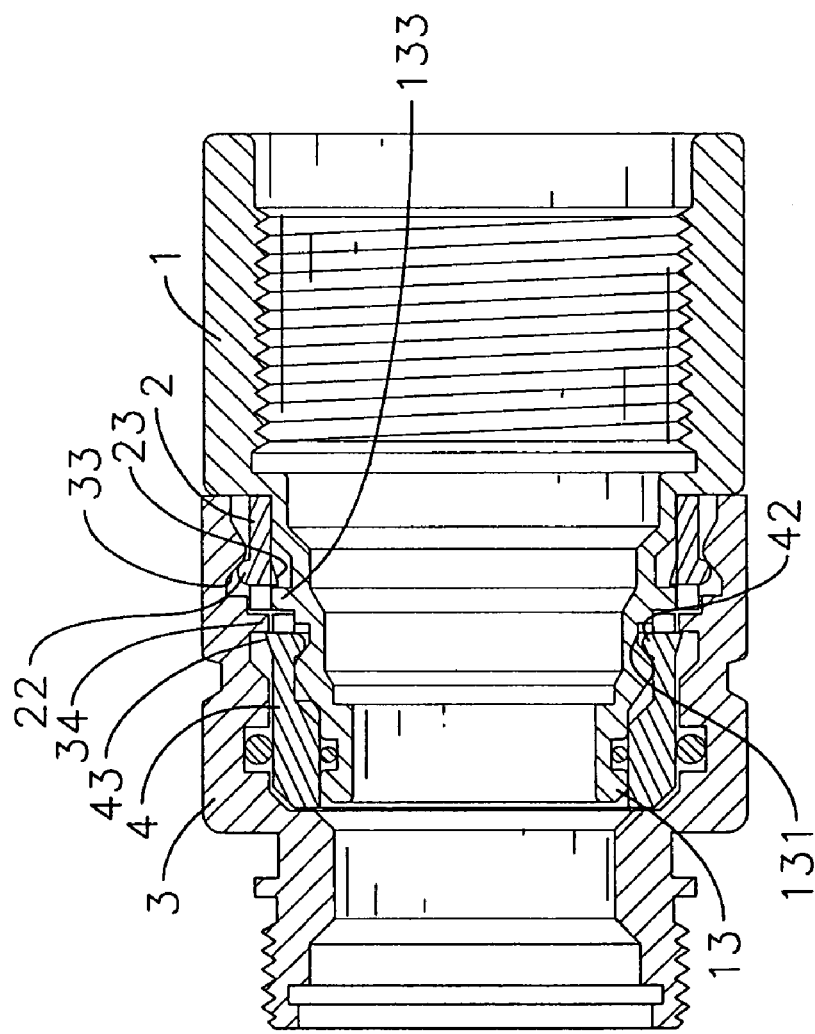
FIG. 4 is a cross sectional view showing the engagement of the male connector and the female connector.

With reference to FIG. 4, it is noted that when the connection assembly of the present invention is combined, the first engaging ring (2) is securely mounted around the extension (13) and the second engaging ring (4) is securely received in the passage (31) of the female connector (3). Thereafter, the extension (13) with the first engaging ring (2) mounted thereon is inserted into the passage (31) of the female connector (3). It is to be noted that the first engaging ring (2) has a diameter larger than that of the second engaging ring (4) such that the second engaging ring (4) is able to be inserted into the first engaging ring (2). Further, due to the first claws (22) extending outward and the second claws (42) extending inward, after the extension (13) of the male connector (1) is inserted into the passage (31) of the female connector (3), the first claws (22) are able to abut a bottom face defining the second annular groove (33) and the second claws (42) are able to abut a bottom face defining the first annular groove (131). From the mutual abutment between the first claws (22) and the second annular groove (33) and between the second claws (42) and the first annular groove (131), the engagement between the male connector (1) and the female connector (3) is secured. However, due to the material for both the first engaging ring (2) and the second engaging ring (4) being a resilient plastic, when a rupturing force is applied to the fuel nozzle, the female connector (3) will be separated from the male connector (1) after the engaging force from the first claws (22) to the second annular groove (33) and the second claws (42) to the first annular groove (131) is overcome.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A connection assembly for connecting a filling hose to a fuel nozzle, the connection assembly comprising:

a male connector having a bore defined through the male connector, an inner threading formed inside the bore for connection with the filing hose, a hollow extension and having two open ends, an outer annular sidewall and a first annular groove defined in an outer periphery of the extension;

a first engaging ring mounted on the extension and having an inner annular sidewall, multiple legs extending from a peripheral edge of the first engaging ring and multiple first claws extending outward from distal ends of the legs;

a female connector having a passage defined through the female connector to correspond to and receive therein the extension of the male connector, a second annular groove defined in an inner periphery of the female connector defining the passage to correspond to the first claws so as to allow the first claws to abut a bottom face defining the second annular groove, a hollow skirt extending from an end opposite the male connector and an outer threading formed on an outer periphery of the skirt for connection with the fuel nozzle; and a second engaging ring securely received in the passage of the female connector and having an outer annular sidewall, multiple fingers extending from a peripheral edge of the second engaging ring and multiple second claws extending inward from distal ends of the fingers to correspond to and abut a bottom face defining the first annular groove such that abutment of the first claws to the second annular groove and of the second claws to the first annular groove secures engagement between the male connector and the female connector.

2. The connection assembly as claimed in claim 1, wherein the first claws are alternately formed with respect to the legs.

3. The connection assembly as claimed in claim 2, wherein the second claws are alternately formed with respect to the fingers.

4. The connection assembly as claimed in claim 1, wherein the first engaging ring has a diameter larger than that of the second engaging ring such that after the extension of the male connector is inserted into the passage of the female connector, the first claws are able to abut the second annular groove and the second claws are able to abut the first annular groove.

5. The connection assembly as claimed in claim 2, wherein the first engaging ring has a diameter larger than that of the second engaging ring such that after the extension of the male connector is inserted into the passage of the female connector, the first claws are able to abut the second annular groove and the second claws are able to abut the first annular groove.

6. The connection assembly as claimed in claim 3, wherein the first engaging ring has a diameter larger than that of the second engaging ring such that after the extension of the male connector is inserted into the passage of the female connector, the first claws are able to abut the second annular groove and the second claws are able to abut the first annular groove.

7. The connection assembly as claimed in claim 6, wherein an engagement strength of the first claws to the periphery defining the second annular groove is dependent from a width of the first claws, and an engagement strength of the second claws to the periphery defining the first annular groove is dependent from a width of the second claws.

8. The connection assembly as claimed in claim 7, wherein the extension of the male connector further has an outer annular lip radially extending outward from the outer annular sidewall of the extension;

the female connector further has an inner annular lip extending inward from the inner periphery of the female connector;

the first engaging ring further has multiple inner hooks extending inward from the inner annular sidewall and hooking the outer annular lip on the extension of the male connector to securely mount the first engaging ring around the male connector; and the second engaging ring further has multiple outer hooks extending outward from the outer annular sidewall of the second engaging ring and hooking the annular inner lip on the inner periphery of the female connector to securely connect the female connector to the male connector.

* * * * *